(12) United States Patent
Zhong et al.

(10) Patent No.: US 8,929,728 B2
(45) Date of Patent: Jan. 6, 2015

(54) METHOD AND SYSTEM FOR IMPLEMENTING AUTOMATIC PROTECTION SWITCHING FOR TRANSMISSION EQUIPMENT

(75) Inventors: Changlong Zhong, Shenzhen (CN); Jian Geng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 133 days.

(21) Appl. No.: 13/580,655

(22) PCT Filed: Sep. 26, 2010

(86) PCT No.: PCT/CN2010/077320
§ 371 (c)(1),
(2), (4) Date: Aug. 22, 2012

(87) PCT Pub. No.: WO2011/106975
PCT Pub. Date: Sep. 9, 2011

(65) Prior Publication Data
US 2012/0315031 A1 Dec. 13, 2012

(30) Foreign Application Priority Data
Mar. 1, 2010 (CN) .......................... 2010 1 0123067

(51) Int. Cl.
*G02F 1/00* (2006.01)
*H04B 10/00* (2013.01)
*H04J 14/00* (2006.01)
*H04J 14/02* (2006.01)
*H04B 10/08* (2006.01)
*H04Q 11/00* (2006.01)
*H04B 10/032* (2013.01)
*H04J 3/14* (2006.01)

(52) U.S. Cl.
CPC .............. *H04Q 11/00* (2013.01); *H04B 10/032* (2013.01); *H04J 3/14* (2013.01); *H04J 2203/0012* (2013.01); *H04J 2203/0025* (2013.01); *H04J 2203/006* (2013.01)

USPC ............ 398/8; 398/5; 398/4; 398/69; 398/79; 398/17

(58) Field of Classification Search
CPC ........... H04B 10/032; H04J 2203/0012; H04J 2203/0025; H04J 3/14; H04J 2203/006; H04Q 11/00
USPC .................................. 398/8, 69, 55, 4, 79, 17
See application file for complete search history.

(56) References Cited

U.S. PATENT DOCUMENTS

| 7,512,060 | B1 * | 3/2009 | Ho et al. | 370/216 |
| 7,554,975 | B2 * | 6/2009 | Smith | 370/369 |

(Continued)

FOREIGN PATENT DOCUMENTS

| CN | 1983931 A | 6/2007 |
| CN | 101431699 A | 5/2009 |

(Continued)

*Primary Examiner* — M. R. Sedighian
*Assistant Examiner* — Abbas H Alagheband
(74) *Attorney, Agent, or Firm* — Koppel, Patrick, Heybl & Philpott

(57) ABSTRACT

A method for realizing an automatic protection switching of a transmission device is provided, and the method includes that: according to a received automatic protection switching trigger condition and information of each line sub-card, which are transmitted by a cross sub-card via a Time Division Multiplexing Fabric to Framer Interface (TFI5) frame, a control sub-card determines to execute protection switching, and sends a protection switching command to the cross sub-card; and the cross sub-card completes the protection switching action. A system for realizing an automatic protection switching of a transmission device is also provided. According to the technical solution of the present invention, the automatic protection switching of the transmission device in an Optical Transport Network (OTN) is achieved conveniently.

6 Claims, 2 Drawing Sheets

(56) References Cited

U.S. PATENT DOCUMENTS

| | | | |
|---|---|---|---|
| 7,583,664 B2 * | 9/2009 | Ho et al. | 370/386 |
| 7,656,891 B1 * | 2/2010 | Calderon et al. | 370/442 |
| 8,238,365 B2 * | 8/2012 | Zhao et al. | 370/466 |
| 2003/0012135 A1 * | 1/2003 | Leroux et al. | 370/228 |
| 2003/0123493 A1 * | 7/2003 | Takahashi | 370/539 |
| 2005/0117905 A1 * | 6/2005 | Lee et al. | 398/79 |
| 2006/0067314 A1 * | 3/2006 | Ho et al. | 370/389 |
| 2006/0092830 A1 * | 5/2006 | Chen et al. | 370/217 |
| 2006/0098660 A1 * | 5/2006 | Pal et al. | 370/395.51 |
| 2006/0140226 A1 * | 6/2006 | Ho et al. | 370/539 |
| 2006/0143544 A1 * | 6/2006 | Ho et al. | 714/44 |
| 2006/0153179 A1 * | 7/2006 | Ho et al. | 370/386 |
| 2006/0221944 A1 * | 10/2006 | Ling et al. | 370/379 |
| 2006/0245450 A1 * | 11/2006 | Bleisteiner et al. | 370/466 |
| 2007/0002854 A1 * | 1/2007 | Smith | 370/389 |
| 2007/0264015 A1 * | 11/2007 | Li et al. | 398/45 |
| 2011/0013911 A1 * | 1/2011 | Alexander et al. | 398/79 |
| 2011/0158648 A1 * | 6/2011 | Kubo et al. | 398/48 |
| 2014/0036926 A1 * | 2/2014 | Nishida et al. | 370/401 |

FOREIGN PATENT DOCUMENTS

| | | | | |
|---|---|---|---|---|
| CN | 101489158 A | 7/2009 | | |
| CN | 101814953 A | 8/2010 | | |
| EP | 1280374 A1 * | 1/2003 | | H04Q 11/04 |
| JP | 2010010995 A | 1/2010 | | |

* cited by examiner

METHOD AND SYSTEM FOR IMPLEMENTING AUTOMATIC PROTECTION SWITCHING FOR TRANSMISSION EQUIPMENT

This is a National Stage Application of PCT/CN2010/077320 filed Sep. 26, 2010, published as WO 2011/106975 A1, and claiming priority from CN201010123067.6 filed Mar. 1, 2010.

FIELD OF THE INVENTION

The disclosure relates to the optic transport network technology in the field of optical communication, and in particular to a method and a system for implementing automatic protection switching for transmission equipment.

BACKGROUND OF THE INVENTION

Optical Transport Network (OTN) is a transport network in the optical layer network based on Wavelength Division Multiplexing (WDM) technology. The OTN is a backbone network of the next generation, and it is a digital transport system and optical transport system of new generation regulated by recommendations of a series of InterNational Telegraph Union Telecommunication Standardization Sector (ITU-T), such as G.872, G.709 and G.798. OTN solves problems such as weak service scheduling capability, weak networking capability and weak protection capability regarding the transparent wavelength or sub-wavelength services of the traditional WDM network. OTN mainly defines an OTUk frame structure. By defining the OTUk frame structure, the user signal adaptation problem and the transparent wavelength or sub-wavelength services scheduling problem of the WDM network can be solved. Also, as the OTUk frame structure has plenty overhead, reliable transmission of the optical layer can be guaranteed, and the problems such as weak protection capability of the traditional WDM network are solved. Through the OTN technology, service scheduling can be achieved more flexibly, the reliability of transmission can be improved, the protection capability of network can be enhanced, and the network can be monitored.

Defined according to recommendations of ITU-T, Synchronous Digital Hierarchy (SDH) is a technical system formed by multiplexing method, mapping method and related synchronization method. The SDH is an information structure in which the corresponding level is provided for the transmission of digital signals at different speed. It can achieve various functions such as effective network management, real-time service monitoring, dynamic network maintenance and intercommunication between equipments from different manufacturers. It greatly improves the utilization of network resources, reduces the management and maintenance expenses, and achieves flexible, reliable and highly efficient network operation and maintenance. Therefore, nowadays the SDH becomes a development and application hotspot of the transmission technology of the information field in the world, and attracts extensive attention. In the related optical communication technologies, network protection switching is executed based on SDH, but there is no method supporting protection switching in OTN.

SUMMARY OF THE INVENTION

Therefore, the main purpose of the disclosure is to provide a method and a system for implementing automatic protection switching for transmission equipment, to implement automatic protection switching for transmission equipment in OTN.

To achieve the above purpose, the technical solutions of the disclosure are implemented as follows.

The disclosure provides a method for implementing automatic protection switching for transmission equipment, comprising:

a control sub-card determining to execute protection switching according to a received automatic protection switching trigger condition and received information of each line sub-card which are transferred by a cross sub-card via Time Division Multiplexing Fabric to Framer Interface (TFI5) frames, and sending a protection switching command to the cross sub-card; and the cross sub-card completing the protection switching action.

In the method, before determining to execute protection switching, the method further comprises:

reporting the information of the each line sub-card to the control sub-card.

In the method, the automatic protection switching trigger condition is transferred to the control sub-card by the cross sub-card via fixed overhead locations of a TFI5 frame.

In the method, before reporting information of each line sub-card to the control sub-card, the method further comprises:

a user setting the automatic protection switching trigger condition in the each line sub-card according to the state of a signal received at a line side and configuration of a Optical Transport Network (OTN).

In the method, setting the automatic protection switching trigger condition comprises:

setting the automatic protection switching trigger condition by means of writing a program via a software interface according to a fiber interface alarm or an Optical Data Unit k (ODUk) service alarm.

In the method, the method further comprises:

according to the received automatic protection switching trigger condition and received information of the each line sub-card, the control sub-card determining that a line sub-card has an abnormity but protection switching is not to be executed, and prompting that the line sub-card has an abnormity.

In the method, the control sub-card determining to execute protection switching according to the received automatic protection switching trigger condition and the received information of the each line sub-card comprises:

the control sub-card judging whether the each line sub-card has any abnormity according to information reported by the each line sub-card, and if a line sub-card has an abnormity, executing protection switching when the abnormity on the line sub-card is consistent with the automatic protection switching trigger condition set on the line sub-card.

The disclosure also provides a system for implementing automatic protection switching for transmission equipment, comprising:

a plurality of line sub-cards, configured to report an automatic protection switching trigger condition and information of the plurality of line sub-cards to a control sub-card by a cross sub-card via Time Division Multiplexing Fabric to Framer Interface (TFI5) frames;

the cross sub-card, configured to transfer the automatic protection switching trigger condition and the information of the plurality of line sub-cards to a control sub-card, receive a protection switching command sent by the control sub-card, and complete the protection switching action; and the control sub-card, configured to determine to execute protection switching according to the received automatic protection switching trigger condition and the received information of the plurality of line sub-cards which are transmitted by the cross sub-card via the TFI5 frames, and send the protection switching command to the cross sub-card.

In the system, each of the plurality of line sub-cards further comprises:

a setting module, configured to set the automatic protection switching trigger condition and send the automatic protection switching trigger condition to a TFI5 frame module; and the TFI5 frame module, configured to define the fixed overhead locations of the TFI5 frames, insert the automatic protection switching trigger condition into the fixed overhead locations of a TFI5 frame, and transfer the automatic protection switching trigger condition and the information of the plurality of line sub-cards to the cross sub-card.

According to the method and the system for implementing automatic protection switching for transmission equipment in the disclosure, the control sub-card can automatically judge whether protection switching is needed. When the protection switching is needed, the control sub-card sends a command and the cross sub-card switches the line sub-card. Thus, when the transmission equipment has any abnormality, the automatic protection switching for transmission equipment in OTN can be implemented conveniently to ensure that the transmission service will not be interrupted. In the disclosure, the fixed overhead locations of the TFI5 frame are also defined. The user can set the automatic protection switching trigger condition by writing a program via the software interface. Therefore the solution of the disclosure has great flexibility, and the implementation of the solution is simple and reliable.

DETAILED DESCRIPTION OF THE EMBODIMENTS

The disclosure proposes a method for implementing automatic protection switching for transmission equipment in OTN. The basic concept of the disclosure is that: a control sub-card determines to execute protection switching according to a received automatic protection switching trigger condition and information of each line sub-card, and sends a protection switching command to the cross sub-card; and the cross sub-card completes the protection switching action.

The disclosure will be described below in detail with reference to drawings and specific embodiments.

In the embodiments of the disclosure, the transmission equipment includes: a plurality of line sub-cards, a cross sub-card and a control sub-card, wherein the plurality of line sub-cards are configured to transmit services, and the cross sub-card is configured to transfer information of the plurality of line sub-cards to the control sub-card.

Figure 1:
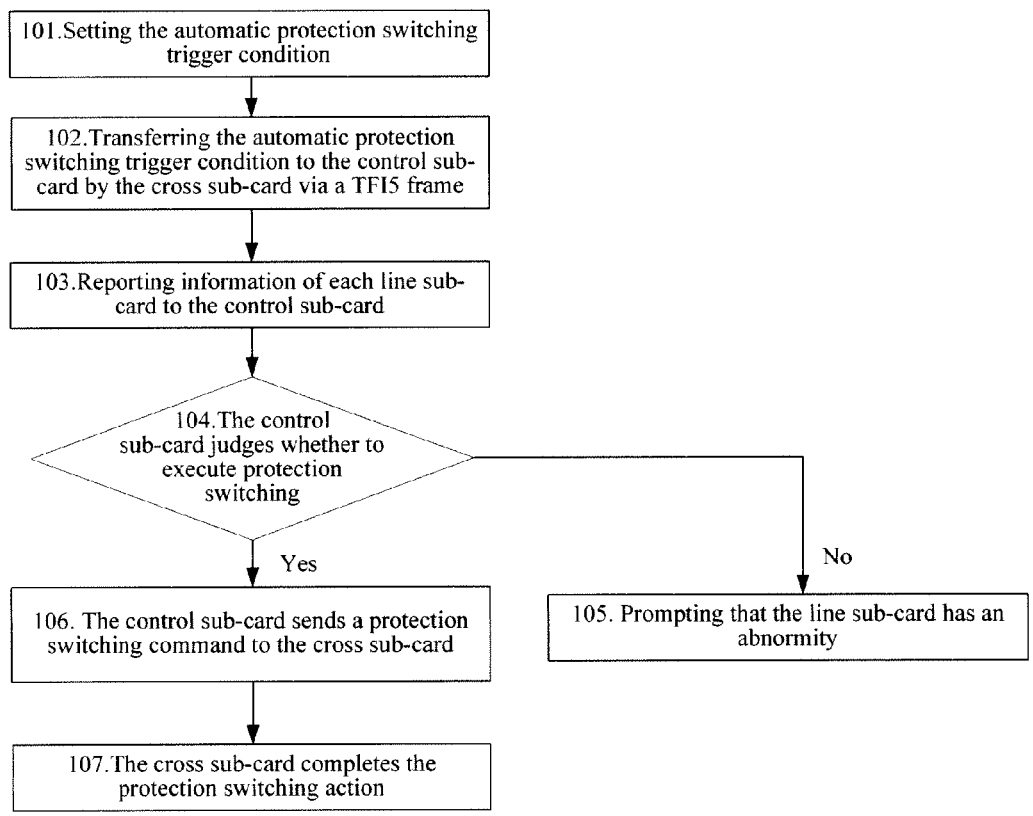
FIG. 1 is a flow chart of a method for implementing automatic protection switching for transmission equipment according to the disclosure.

FIG. 1 is a flow chart of a method for implementing automatic protection switching for transmission equipment according to the disclosure. As shown in FIG. 1, the method comprises the following steps.

Step 101: setting the automatic protection switching trigger condition. Specifically, the user can set the automatic protection switching trigger condition on the setting module of each line sub-card according to the state of signals received at the line side and the configuration of the OTN. The automatic protection switching trigger conditions can be classified into two types. One is the protection switching trigger condition generated according to an alarm from a fiber interface, such as Lose of Signal (LOS), Signal Fail (SF) and Signal Degraded (SD) or the like from an Optical Transform Unit (OTU) fiber interface in OTN. The other type is the protection switching trigger condition generated according to an ODUk service alarm, such as Lose of Frame (LOF), Lose of Multiplex Frame (LOM) or the like.

The user can set an automatic protection switching trigger condition by writing a program via the software interface.

Step 102: transferring the automatic protection switching trigger condition to the control sub-card by the cross sub-card via a TFI5 frame.

Specifically, line sub-card inserts the automatic protection switching trigger condition into fixed overhead locations of TFI5 frame. Insertion method may be: loading information carrying the automatic protection switching trigger condition into bit information of TFI5 frame. TFI5 refers to implementation agreement from Time Division Multiplex and Multiplexer (TDM) bus matrix to framer interface, and is used for defining data exchange of interface between the TDM cross matrix and the TDM framer, as shown in Table 1:

TABLE 1

|   | 17...20 | 21...24 | 25...28 | 29...32 | 33...48 | 49...144 |
|---|---------|---------|---------|---------|---------|----------|
| 1 | A1      |         |         |         | A1      | A2       |
| 2 | Fiber interface SD/SF | | | | | |
| 3 |         | ODUk SD/SF | | | | |
| 4 |         |         |         |         |         |          |
| 5 |         |         |         |         |         |          |
| 6 |         |         |         |         |         |          |
| 7 |         |         |         |         |         |          |
| 8 |         |         |         |         |         |          |
| 9 |         |         |         |         |         |          |

Table 1 shows all overhead locations in the TFI frame. The fixed overhead locations of the TFI5 frame are the overhead locations that are not used in all overhead locations in the TFI5 frame. For instance, the 17th column to the 20th column in the 2nd line or the 17th column to the 32nd column in the 3rd line can be used as the fixed overhead locations of the TFI5 frame. The fixed overhead locations of the TFI5 frame are used for transferring the automatic protection switching trigger condition to the cross sub-card. The cross sub-card transfers the automatic protection switching trigger condition to the control sub-card. And the control sub-card extracts the automatic protection switching trigger condition from the fixed overhead locations of the received TFI5 frame and saves it.

Step 103: reporting information of each line sub-card to the control sub-card.

Specifically, each line sub-card periodically inserts information of the line sub-card to the fixed overhead locations of the TFI5 frame. Information of each line sub-card is transferred to the cross sub-card via the TFI5 frame and then transferred to the control sub-card by the cross sub-card. The control sub-card receives and saves information of each line sub-card. The information is the line state of each line sub-card, such as the strength of signals in the line and the transfer state of the frame or the like. If the report period is the period of the TFI5 frame and the frequency is 2.5 GHZ, the period is 1/2.5 GHZ. As the report period is extremely short, the line sub-card reports information of the line sub-card substantially in real-time.

Step 104: The control sub-card judges whether to execute protection switching; and if no, execute Step 105; if yes, execute Step 106.

Specifically, the control sub-card judges whether each line sub-card has any abnormity according to the information reported by each line sub-card. If a line sub-card has an abnormity, the control sub-card judges whether the abnormity on the line sub-card is consistent with the automatic protection switching trigger condition set on the line sub-card, for example whether there is any phenomenon of the automatic protection switching trigger condition LOS, LOF or LOM on the line sub-card. If it is not consistent, protection switching will not be executed and Step 105 is to be executed; and if it is consistent, protection switching will be executed and Step 106 is executed. If there is no abnormity, no action will be performed.

Step 105: The control sub-card prompts that the line sub-card has an abnormity.

Specifically, the control sub-card prompts the user that the line sub-card has an abnormity. The prompting manner may be that: the control sub-card writes a historic document via software. Such manner is helpful to save information related to the abnormity in the line sub-card for future enquiry. And the prompting manner also may be prompt by material objects, such as indicator light, sound or the like.

Step 106: The control sub-card sends a protection switching command to the cross sub-card.

Step 107: The cross sub-card completes the protection switching action.

Specifically, after receiving the protection switching command sent by the control sub-card, the cross sub-card switches services transferred on the abnormal line sub-card to a line sub-card selected by the control sub-card from spare line sub-cards on which abnormity is never happened. The control sub-card selects one line sub-card from spare line sub-cards on which abnormity is never happened, to transfer services according to the information reported by each line sub-card and the state of the links between transmission equipment. And the cross sub-card completes the protection switching action. The control sub-card can obtain the state of the links between transmission equipment by receiving information of the line sub-card transferred by each line sub-card. If the abnormal line sub-card is recovered, services are still transferred on the original line sub-card, and no switching is executed. The recovered line sub-card may serve as a spare line sub-card when other line sub-cards have an abnormity.

Figure 2:
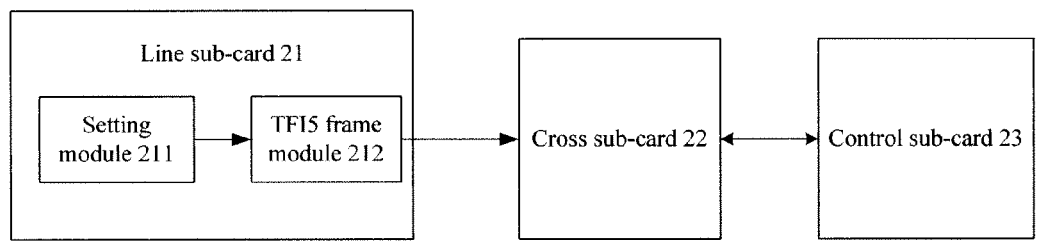
FIG. 2 is a structure diagram of a system for implementing automatic protection switching for transmission equipment according to the disclosure.

To implement the above method, the disclosure also provides a system for implementing automatic protection switching for transmission equipment. As shown in FIG. 2, the system comprises: a line sub-card 21, a cross sub-card 22 and a control sub-card 23, wherein the line sub-card 21 is configured to report an automatic protection switching trigger condition and information of the line sub-card to the control sub-card 23 by the cross sub-card 22 via TFI5 frames, wherein there may be a plurality of line sub-cards;

the cross sub-card 22 is configured to transfer the automatic protection switching trigger condition and information of the line sub-card to the control sub-card, receive a protection switching command sent by the control sub-card 23, and complete the protection switching action; and the control sub-card 23 is configured to determine to execute protection switching according to the received automatic protection switching trigger condition and the received information of the line sub-card, which are transmitted by the cross sub-card via the TFI5 frames, and send the protection switching command to the cross sub-card 22.

The line sub-card 21 further comprises:

a setting module 211, configured to set the automatic protection switching trigger condition and send the automatic protection switching trigger condition to a TFI5 frame module 212; and the TFI5 frame module 212, configured to define the fixed overhead locations of the TFI5 frames, insert the automatic protection switching trigger condition into the fixed overhead locations of a TFI5 frame, and transfer the automatic protection switching trigger condition and the information of the line sub-card to the cross sub-card.

The cross sub-card 22 is further configured to receive the automatic protection switching trigger condition and the information of the line sub-card sent by the TFI5 frame module 212 in the line sub-card 21, and send the same to the control sub-card 23.

The control sub-card 23 is further configured to determine that a line sub-card has an abnormity and protection switching is not to be executed, according to the received automatic protection switching trigger condition and the received information of each line sub-card, and prompt that the line sub-card has an abnormity. Specifically, the control sub-card extracts the automatic protection switching trigger condition from the fixed overhead locations of the received TFI5 frame and saves it.

The automatic protection switching trigger condition is transferred to the control sub-card 23 by the cross sub-card 22 via the fixed overhead locations of a TFI5 frame.

The step that the setting module 211 sets the automatic protection switching trigger condition comprises: according to a fiber interface alarm or an ODUk service alarm, setting the automatic protection switching trigger condition by means of writing a program via a software interface.

The step that the control sub-card 23 determines to execute protection switching according to the received automatic protection switching trigger condition and the received information of each line sub-card comprises: the control sub-card 23 judging whether each line sub-card has any abnormity according to the information reported by each line sub-card; and if there is some abnormity on a line sub-card, executing protection switching when the abnormity on the line sub-card is consistent with the automatic protection switching trigger condition set on the line sub-card.

The above contents are only preferred embodiments of the disclosure and are not intended for limiting the disclosure. Any modifications, equivalent replacements and improvements within the spirit and principle of the disclosure should be within the protection scope of the disclosure.

What is claimed is:

1. A method for implementing automatic protection switching for transmission equipment, comprising:

a control sub-card determining to execute protection switching according to a received automatic protection switching trigger condition and received information of each line sub-card which are transferred by a cross sub-card via Time Division Multiplexing Fabric to Framer Interface (TFI5) frames, and sending a protection switching command to the cross sub-card; and the cross sub-card completing the protection switching action;
wherein before determining to execute protection switching, the method further comprises: reporting the information of each line sub-card to the control sub-card;
and before reporting the information of each line sub-card to the control sub-card, the method further comprises: a user setting the automatic protection switching trigger condition in each line sub-card according to the state of a signal received at a line side and the configuration of an Optical Transport Network (OTN);
wherein setting the automatic protection switching trigger condition comprises: setting the automatic protection switching trigger condition by means of writing a program via a software interface according to a fiber interface alarm or an Optical Data Unit k (ODUk) service alarm.

2. The method according to claim 1, wherein the automatic protection switching trigger condition is transferred to the control sub-card by the cross sub-card via fixed overhead locations of a TFI5 frame.

3. The method according to claim 1, further comprising:
according to the received automatic protection switching trigger condition and received information of the each line sub-card, the control sub-card determining that a line sub-card has an abnormity but protection switching is not to be executed, and prompting that the line sub-card has an abnormity.

4. The method according to claim 1, wherein the control sub-card determining to execute protection switching according to the received automatic protection switching trigger condition and the received information of the each line sub-card comprises:
the control sub-card judging whether the each line sub-card has any abnormity according to information reported by the each line sub-card, and if a line sub-card has an abnormity, executing protection switching when the abnormity on the line sub-card is consistent with the automatic protection switching trigger condition set on the line sub-card.

5. A system for implementing automatic protection switching for transmission equipment, comprising:
a plurality of line sub-cards, configured to report an automatic protection switching trigger condition and information of the plurality of line sub-cards to a control sub-card by a cross sub-card via Time Division Multiplexing Fabric to Framer Interface (TFI5) frames, wherein the information of each line sub-card is reported to the control sub-card before determining to execute protection switching, and before reporting the information of each line sub-card to the control sub-card, a user setting the automatic protection switching trigger condition in each line sub-card according to the state of a signal received at a line side and the configuration of an Optical Transport Network (OTN), wherein setting the automatic protection switching trigger condition comprises: setting the automatic protection switching trigger condition by means of writing a program via a software interface according to a fiber interface alarm or an Optical Data Unit k (ODUk) service alarm;

the cross sub-card, configured to transfer the automatic protection switching trigger condition and the information of the plurality of line sub-cards to a control sub-card, receive a protection switching command sent by the control sub-card, and complete the protection switching action; and the control sub-card, configured to determine to execute protection switching according to the received automatic protection switching trigger condition and the received information of the plurality of line sub-cards which are transmitted by the cross sub-card via the TFI5 frames, and send the protection switching command to the cross sub-card.

6. The system according to claim 5, wherein each of the plurality of line sub-cards further comprises:
a setting module, configured to set the automatic protection switching trigger condition and send the automatic protection switching trigger condition to a TFI5 frame module; and the TFI5 frame module, configured to define the fixed overhead locations of the TFI5 frames, insert the automatic protection switching trigger condition into the fixed overhead locations of a TFI5 frame, and transfer the automatic protection switching trigger condition and the information of the plurality of line sub-cards to the cross sub-card.

* * * * *